(12) United States Patent
Gumpoltsberger et al.

(10) Patent No.: US 7,421,919 B2
(45) Date of Patent: Sep. 9, 2008

(54) DOUBLE CLUTCH TRANSMISSION

(75) Inventors: Gerhard Gumpoltsberger, Friedrichshafen (DE); Jens Patzner, Potsdam (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 291 days.

(21) Appl. No.: 11/346,481

(22) Filed: Feb. 2, 2006

(65) Prior Publication Data

US 2006/0169076 A1 Aug. 3, 2006

(30) Foreign Application Priority Data

Feb. 3, 2005 (DE) .................. 10 2005 005 163

(51) Int. Cl.
 *F16H 3/091* (2006.01)
(52) U.S. Cl. .......................... 74/330; 74/340
(58) Field of Classification Search ............ 74/340, 74/665 T
 See application file for complete search history.

(56) References Cited

U.S. PATENT DOCUMENTS

| | | |
|---|---|---|
| 4,771,648 A | 9/1988 | Bardoll |
| 5,503,039 A | 4/1996 | Bailly et al. |
| 6,044,931 A | 4/2000 | Reed, Jr. et al. |
| 6,675,668 B2 | 1/2004 | Schamscha |
| 7,040,186 B2 | 5/2006 | Pollak |
| 2004/0093972 A1 | 5/2004 | Gumpoltsberger et al. |
| 2005/0103140 A1* | 5/2005 | Gumpoltsberger ........... 74/329 |

FOREIGN PATENT DOCUMENTS

| | | |
|---|---|---|
| DE | 30 33 625 A1 | 4/1982 |
| DE | 35 30 017 A1 | 2/1987 |
| DE | 35 46 454 A1 | 2/1987 |
| DE | 41 37 143 A1 | 5/1993 |
| DE | 199 50 696 A1 | 4/2001 |
| DE | 102 53 259 A1 | 5/2004 |
| DE | 103 60 075 A1 | 7/2004 |
| DE | 103 43 995 A1 | 5/2005 |

* cited by examiner

Primary Examiner—Sherry Estremsky
Assistant Examiner—Edwin A Young
(74) Attorney, Agent, or Firm—Davis Bujold & Daniels, P.L.L.C.

(57) ABSTRACT

A double clutch transmission with a double clutch, the input side of which can be driven and the output sides each communicate with one of two transmission input shafts that are arranged coaxially relative to one another, with an intermediate shaft and with fixed or idler gears that are mounted or rotatably supported on the shafts, and with shifting units that are allocated to the idler gears, with which the idler gears can be non-rotatably connected to the properly allocated shaft for the purpose of realizing gear ratio. To allow a more cost-effective production of this type of transmission, the fixed gears for the reverse gear and first gear are arranged axially directly in front each other on the same transmission input shaft, or that the fixed gears for the reverse gear and for the first gear are designed as a single common fixed gear.

18 Claims, 1 Drawing Sheet

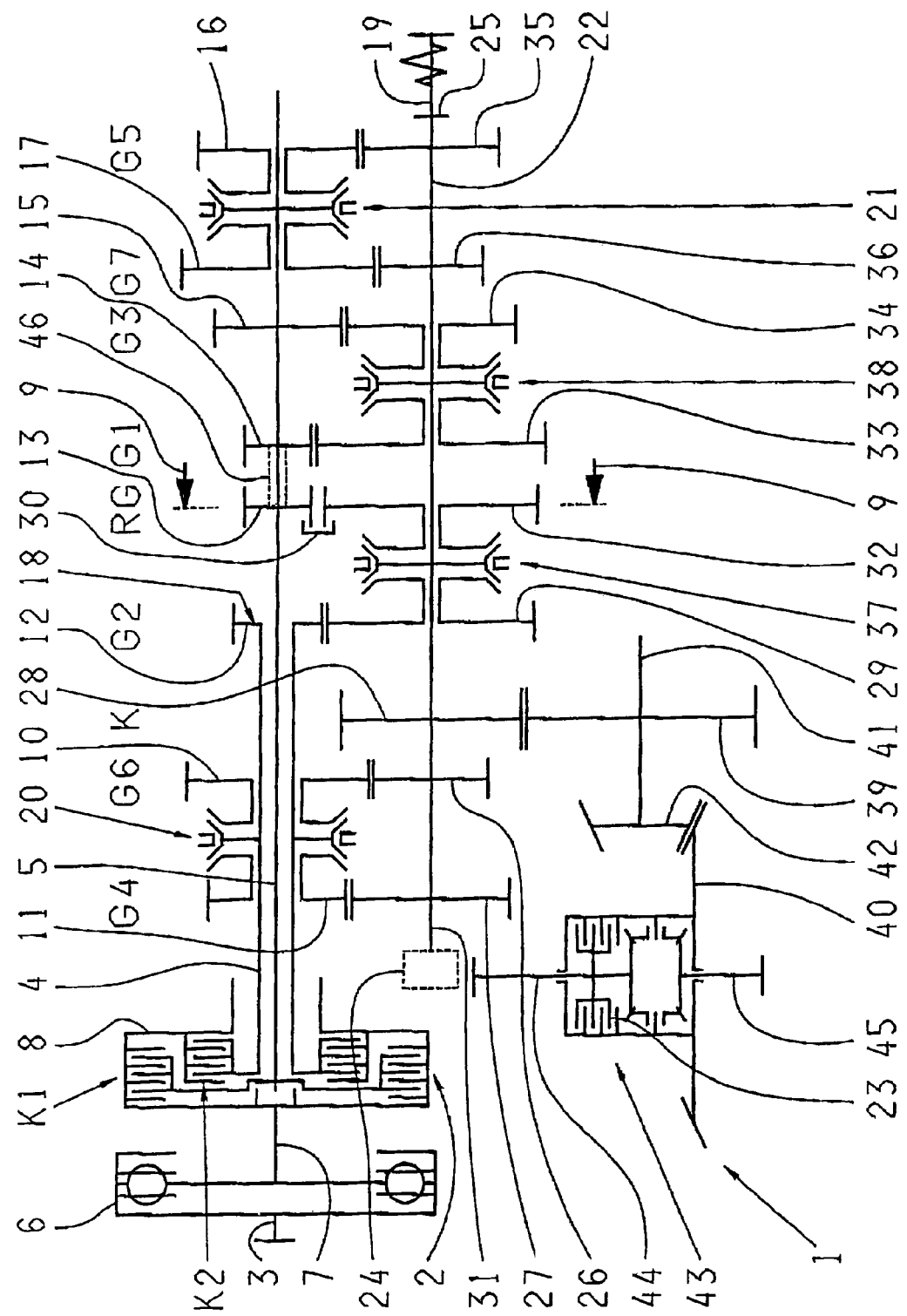

DOUBLE CLUTCH TRANSMISSION

This application claims priority from German Application Serial No. 10 2005 005 163.4 filed Feb. 3, 2005.

FIELD OF THE INVENTION

The invention relates to a double clutch transmission.

BACKGROUND OF THE INVENTION

From the prior art DE 35 46 454 C2, a double clutch transmission is known in which the output sides of two starting and shifting clutches that are arranged, one directly in front of the other, axially can be connected to the drive shaft of a drive engine. The output side of one of the two clutches is non-rotatably connected to a hollow shaft in which a shaft, that is connected to the output side of the other clutch, is supported. In addition, toothed gears for the second gear and the fourth gear are mounted on the hollow shaft, while toothed gears for the first gear, the fifth gear, the third gear and the reverse gear are mounted on the open area of the other shaft. These fixed gears, one for each gear ratio, mesh with allocated idler gears, which are arranged on an axially parallel intermediate shaft and can be connected to this shaft by way of synchronizer clutches (shifting units). Two transmission gears are allocated to each of these synchronizer clutches. The gear sequence for this transmission, based upon the double clutch, is second gear, fourth gear, first gear, fifth gear, third gear and reverse gear.

Further from DE 41 37 143 A1, a multi-stage synchronized auxiliary transmission is known in which the gear positions of two gears in each case are allocated to one of several shifting units. These shifting units are generally comprised of sliding sleeves that are axially displaceable, but non-rotatably connected to a transmission shaft which, during a shifting process, function together with synchronizer rings arranged adjacent to these sliding sleeves to brake toothed idler gears and can non-rotatably connect the idler gears to this transmission shaft.

With this known transmission, the two gears that are allocated to a single shifting unit (first gear and third gear or second gear and fourth gear) are two non-sequential transmission gears. This transmission construction is associated with the advantage that in this manner a transmission shifting system is created with which overlapping shifting activity and thus reduced shifting times are possible. It is disadvantageous, however, that a transmission of this type cannot be shifted by way of a shifting device comprising an H-shift gate as with such a gate, customarily only directly sequential transmission gears, can be shifted in the same shift track.

To overcome this problem, DE 102 53 259.1 proposed a universally configurable double clutch transmission, which is comprised essentially of a start-up assembly, a core transmission and an output assembly wherein the start-up assembly comprises a single clutch, a double clutch or a torque converter. The output assembly contains transmission components for a front-transverse drive, for a front-horizontal drive, for a rear-horizontal drive or for an all-wheel drive. The core transmission is designed as an auxiliary transmission, which is equipped with at least one input shaft, one intermediate shaft and one transmission output shaft, which is not oriented coaxially to the at least one transmission input shaft.

The gear sequence for this transmission is such that, based upon the clutch, the fourth gear is followed by the sixth gear, the second gear, the reverse gear, the seventh, the fifth, the third and the first gear. In this, the fixed gears for the fourth, sixth, second and reverse gears are non-rotatably mounted on a hollow shaft, which is connected to the output side of one of the two clutches in a double clutch, while the fixed gears of the seventh, the fifth, the third and the first gears are mounted on a shaft that is supported coaxially in the aforementioned hollow shaft and is connected to the output side of the second clutch in the double clutch.

Finally, from the unpublished German Patent Application DE 103 43 995.1, a double clutch transmission with a forward construction is known in which the idler gears for the sixth gear and for the fourth gear and the fixed gears for the second gear and the reverse gear are arranged on the transmission input shaft, which is designed as a hollow shaft, in the stated sequence. In this, between the idler gears for the sixth gear and the fourth gear, a single, common shifting unit for these gears is allocated with which they can be connected to the hollow transmission input shaft.

On the second transmission input shaft, which is supported in the hollow transmission input shaft, the fixed gears for the first gear and for the third gear and the idler gears for the fifth gear and the seventh gear are arranged in that order. The idler gears for the fifth and the seventh gear can be non-rotatably connected to the second transmission input shaft by way of a shifting unit that is common to these two gears and is positioned between them.

The intermediate shaft supports the idler gears that are allocated to the aforementioned fixed gears and the shifting units allocated to the idler gears in pairs, with known-in-the-art shifting clutches. In addition, a fixed gear is arranged on the intermediate shaft between the toothed gears of the fourth gear and the second gear, and meshes with a fixed gear on an output shaft that leads to a front-axle, differential transmission.

With this as the prior art background, the objective of the invention is to introduce a transmission structure for a double clutch transmission comprising seven forward gears and one reverse gear, which is suitable for front-horizontal installation in a vehicle and which has an output that is not coaxial to the drive. A further objective consists in that this transmission should be capable of driving the forward wheels and the rear wheels of a vehicle and, based upon its construction, it should be more cost-effective to produce than known forward construction double clutch transmissions.

SUMMARY OF THE INVENTION

The invention is based upon the knowledge that with the construction according to the invention, a short-type double clutch transmission can be realized and, that by using the same gears, its manufacturing costs can be reduced. The same effect is recorded when only one fixed gear is used to drive two idler gears, which are allocated to two different gears. Thus in a first variation, the transmission of the invention has two identical, fixed gears on one transmission input shaft; one of which drives the idler gear of the first gear and the other serves to drive a reverse intermediate gear which, in turn, drives a reverse idler gear. In a second variation of the invention, a common fixed gear is arranged on the transmission input shaft and meshes both with the reverse intermediate gear and with the idler gear for the reverse gear.

Thus, the invention relates to a double clutch transmission with a double clutch, the input side of which can be driven, via a drive shaft of a drive engine, while each of its output sides is in drive-connection with one of two transmission input shafts that are arranged coaxially relative to one another with an intermediate shaft and with fixed or idler gears that are mounted on the shafts or are rotatably mounted in bearings, and with shifting units that are allocated to the idler gears with which the idler gears can be non-rotatably connected to the properly allocated shaft for the purpose of realizing gear ratios, wherein two gears that are not in direct sequence to one another are allocated to each of the shifting units.

For the purpose of achieving the objectives, it is also provided that the fixed gear for the reverse gear and the fixed gear for the first gear are arranged axially directly, one in front of the other, on the same transmission input shaft or that the fixed gear for the reverse gear and the fixed gear for the first gear are designed as a single toothed gear, which is arranged on the same transmission input shaft.

According to one preferred embodiment of the invention, it is provided that the single common fixed gear, or the fixed gear for the reverse gear (RG) and the fixed gear for the first gear, are arranged on the coaxially inner transmission input shaft where the latter two gears are identical in design with respect to their dimensions and their pinion gearing.

With respect to a further embodiment of the invention, it is considered sensible for the fixed gear for the reverse gear to be arranged between the axial end of the hollow transmission input shaft and the fixed gear for the first gear. This is associated with the advantage that the high drive torque that can be transmitted at a low speed via the toothed gears for the first gear and the reverse gear is transmitted in an area of the coaxially inner transmission input shaft that lies as close as possible to the double clutch. In this manner, the torsional load on this transmission input shaft during starting processes can be confined to a comparatively short section of the shaft.

In a further embodiment, it is advantageous for the fixed gear for the second gear to be arranged on the axially open end of the hollow transmission input shaft.

In addition, it can be beneficial for a double clutch transmission that is integrated into a vehicle drive train if a torsional oscillation damper is arranged between the input side of the double clutch transmission and the drive shaft of a drive engine. This type of design leads, among other things, to an increase in comfort during operation of a vehicle equipped in this manner.

In a further embodiment of the invention, it is provided that the toothed gears for the even-numbered gears G2, G4, G6 are arranged on the hollow transmission input shaft, while the toothed gears for the odd-numbered gears G1, G3, G5, G7, along with the reverse gear, are arranged on the other transmission input shaft.

A further characterizing feature of a transmission of this type can be that the gear sequence based upon the double clutch is as follows: fourth gear, sixth gear, second gear, reverse gear, first gear, third gear, seventh gear and fifth gear.

According to one variation on this gear sequence, it can be provided that the sequence based upon the double clutch is as follows: sixth gear, fourth gear, second gear, reverse gear, first gear, third gear, fifth gear and seventh gear.

Furthermore, it is possible for a double clutch transmission having the characterizing features of the invention to be designed with only six forward gears, without resulting in a loss of the advantages gained by the invention.

In this connection, it is also considered advantageous for the gear sequence for the fixed gears on the two transmission input shafts that are arranged coaxially relative to one another to be as follows, based upon the double clutch: second gear, reverse gear, first gear and third gear.

According to a further characterizing feature of a double clutch transmission as specified in the invention, it is provided that the fixed gears of the reverse gear, the first gear and the third gear can be driven via the radially outer clutch, while the fixed gear of the second gear can be driven via the radially inner clutch of the double clutch.

A further variation of the invention provides that axially between the two shifting units on the two transmission input shafts, two shifting units are arranged on the intermediate shaft. In this connection, it is considered advantageous for a single common shifting unit to be allocated to the idler gears for the sixth gear and the fourth gear, for a single common shifting unit to also be allocated to the idler gears for the fifth gear and the seventh gear, for a single common shifting unit to be allocated to the idler gears for the second gear and the reverse gear on the intermediate shaft, and for another common shifting unit to be allocated to the idler gears for the first gear and the third gear on the intermediate shaft.

According to a further characterizing feature of the invention, it is provided that the reverse idler gear meshes with a reverse intermediate gear which, in turn, meshes with the same toothing with the reverse fixed gear or with the common fixed gear for the reverse gear and the first gear on the transmission input shaft, wherein all of these reverse toothed gears are arranged in a single common reverse gear plane.

In addition, it can be provided that a fixed output gear is non-rotatably arranged on the intermediate shaft and meshes with an output gear that is mounted on an output shaft, the open end of which supports a bevel gear, which meshes with an outer set of teeth on the housing of a differential transmission.

This fixed output gear is preferably arranged between the fixed gear for the sixth gear or the fixed gear for the fourth gear and the idler gear for the second gear on the intermediate shaft.

Additionally, it can be provided that the aforementioned output shaft leads to a differential transmission of the vehicle that is allocated to the front-axle, drive shafts or to the rear-axle drive shafts.

Independent of or in addition to this, a further variation of the invention provides that the end of the intermediate shaft that points away from the double clutch can be connected to an output shaft that leads to the rear wheels of the vehicle, for example, to a cardan shaft.

Furthermore, as an alternative to the just described drive of the front-axle, differential transmission, via the special output shaft, it can be provided that the end of the intermediate shaft that points toward the double clutch itself supports a bevel gear, which meshes with an outer toothing on the housing of a differential transmission in the area of the front axle or the individually suspended wheels of the vehicle.

Finally, it can be provided that the intermediate shaft drives an inter-axle, differential transmission of any design. An inter-axle, differential transmission of this type is positioned on the side of the intermediate shaft that faces away from the engine, for example.

BRIEF DESCRIPTION OF THE DRAWING

The invention will now be described, by way of example, with reference to the accompanying drawing in which:

The sole FIGURE shows a schematic construction of a double clutch transmission according to the invention.

DETAILED DESCRIPTION OF THE INVENTION

A transmission 1 is equipped at its input side with a double clutch 2, which is comprised of two individually controllable clutches K1 and K2. In this, the clutch K1 is arranged radially above the clutch K2. In this exemplary embodiment, an input side 8 of this double clutch 2 is drive-connected to a secondary side 7 of a torsional oscillation damper 6, a primary side 3 of which can be coupled to the crankshaft of an internal combustion engine.

On the output side of the double clutch 2, the radially inner clutch K2 is connected to a hollow transmission input shaft 4, in which an inner transmission input shaft 5 that is connected to the clutch K1 is coaxially arranged. Parallel to these two transmission input shafts 4 and 5, an intermediate shaft 22 is arranged in the double clutch transmission 1 which, based upon the transmission gear that has just been engaged, can be driven by different sets of gear wheels. Each of these sets of gear wheels comprises a fixed gear and an idler gear, wherein the idler gears are rotatably mounted on their allocated transmission shaft and can be non-rotatably connected by way of shifting clutches, referred to here as shifting units, via sliding sleeves to the proper transmission shaft.

Specifically, this exemplary double clutch transmission 1 is designed such that, based upon the double clutch 2, along the extension of the transmission input shafts 4, 5, the sets of gear wheels for a fourth gear G4, a sixth gear G6, a second gear G2, a reverse gear RG, a first gear G1, a third gear G3, a seventh gear G7 and a fifth gear G5 are arranged axially one behind the other.

In this sequence, beginning with the double clutch 2, idler gears 11 and 10 for the fourth gear G4 and the sixth gear G6, followed by a fixed gear 12 for the second gear G2 are arranged on the hollow transmission input shaft 4. These are followed by a fixed gear 13 for the reverse gear RG, a fixed gear 14 for the first gear G1, a fixed gear 15 for the third gear G3, an idler gear 17 for the seventh gear G7 and an idler gear 16 for the fifth gear G5, behind an open end face 18 of the hollow transmission input shaft 4, on the inner transmission input shaft 5.

Accordingly, on the intermediate shaft 22, beginning in the area of the double clutch 2 in this sequence, a fixed gear 27 for the fourth gear G4, a fixed gear 26 for the sixth gear G6, a further fixed gear 28 for a transmission constant K, an idler gear 29 for the second gear G2, an idler gear 32 for the reverse gear RG, an idler gear 33 for the first gear G1, an idler gear 34 for the third gear G3, a fixed gear 36 for the seventh gear G7 and a fixed gear 35 for the fifth gear G5 are arranged. In this, the idler gears mesh with the allocated fixed gears as indicated.

As is also clearly discernible from this description, in this double clutch transmission 1 a total of four already mentioned shifting units 20, 21, 37, 38 are arranged, wherein each shifting unit can non-rotatably connect two idler gears, alternatively to one another, to the properly allocated transmission shaft 4, 5 or 22 in a known manner. Thereby, on both the hollow transmission input shaft 4 and the inner transmission input shaft 5, one shifting unit 20 or 21 is arranged between the idler gears for the fourth gear G4 and the sixth gear G6 or between the idler gears for the seventh gear G7 and the fifth gear G5, respectively, while on the forward shaft 22, axially between them, the shifting unit 37 is arranged between the idler gears for the second gear G2 and the reverse gear RG, or between the idler gears for the first gear G1 and the third gear G3.

The above-mentioned fixed gear 28 on the intermediate shaft 22 meshes via its spur gear toothing with a fixed gear 39 on a transmission output shaft 41, which supports a bevel gear 42 on its end that points toward the vehicle's front axle, which bevel gear meshes in a drive engagement with a bevel gear toothing 40 on the housing of a differential transmission 43. As the diagram shows, this differential transmission 43 is equipped with a shifting clutch 23, so that the drive torque can be controllably distributed to the right and the left sides of the front wheels of the vehicle. The drive torque is transmitted in a known manner from the differential transmission 43, via axle drive shafts 44, 45, to individually spring-suspended, front vehicle wheels.

It is of particular importance in this double clutch transmission 1 that the fixed gears 13 and 14 of the reverse gear RG and of the first gear G1 are arranged on the same transmission input shaft 5, axially directly one in front of the other, and that they are largely identical in design and can thus be manufactured at a cost savings. The identical nature of these two fixed gears 13 and 14 preferably extends not only to their materials and dimensions, but also to their pinion gear toothing.

In the drawing, the dashed base lines between the fixed gear 13 for the reverse gear RG and the fixed gear 14 for the first gear G1 indicate that these two fixed gears 13 and 14 may also be designed as a single structural unit. In practical terms, this can be realized in that only a single common fixed gear 46 for the reverse gear RG and the first gear G1 is arranged on the coaxially inner transmission input shaft 5, which is equipped with outer toothing that extends axially long enough that both a reverse intermediate gear 30 and the idler gear 33 for the first gear can mesh with it.

A further characterizing feature of this transmission is that all reverse toothed gears are arranged in a single reverse toothed gear plane 9. These reverse toothed gears include the reverse fixed gear 13 on the inner transmission input shaft 5, a reverse intermediate toothed gear 30 that is represented here only symbolically by a bracket 30, which is positioned above or below the plane of the drawing, in the plane 9, and the reverse idler gear 32 on the intermediate shaft 22.

The drawing also shows that this double clutch transmission 1 is capable of driving vehicles with front-wheel and rear-wheel drive. Thus, the end 25 of the intermediate shaft 22 that points away from the double clutch 2 can be connected to a drive shaft 19, which as a cardan shaft leads to a rear-axle differential transmission that is not further illustrated here.

As an alternative to the already described front-axle drive via the output shaft 41 and the front-axle differential transmission 43, it may also be provided that a front-axle differential transmission 24 is driven by an end 31 of the intermediate shaft 22 that is near the double clutch. Of course, the double clutch transmission can also be designed exclusively to drive the vehicle's rear wheels or to drive the vehicle's front wheels, as described.

Among the fundamental advantages of a double clutch transmission, produced according to the invention, is that the reverse gear can be constructed for a higher gear ratio than is customary and that, with a smaller outer transmission diameter, the coaxially inner transmission input shaft can have a greater diameter and thereby a greater torsional stiffness.

Reference numerals 1 double clutch transmission
2 double clutch
3 primary side torsional oscillation damper
4 hollow transmission input shaft
5 transmission input shaft
6 torsional oscillation damper
7 secondary side of torsional oscillation damper
8 input side of double clutch
9 Reverse gear wheel plane
10 idler gear, $6^{th}$ gear
11 idler gear, $4^{th}$ gear
12 fixed gear, $2^{nd}$ gear
13 fixed gear, reverse gear
14 fixed gear, $1^{st}$ gear -continued

| Reference numerals |
| --- |
| 15 fixed gear, 3rd gear |
| 16 idler gear, 5th gear |
| 17 idler gear, 7th gear |
| 18 axial end of the hollow transmission input shaft |
| 19 cardan shaft |
| 20 shifting unit |
| 21 shifting unit |
| 22 intermediate shaft |
| 23 clutch in differential transmission 43 differential transmission |
| 25 end of intermediate shaft 22 |
| 26 fixed gear, 6th gear |
| 27 fixed gear, 4th gear |
| 28 fixed output gear of the constant K |
| 29 idler gear, 2nd gear |
| 30 reverse intermediate gear |
| 31 end of intermediate shaft 22 |
| 32 idler gear, reverse gear |
| 33 idler gear, 1st gear |
| 34 idler gear, 3rd gear |
| 35 fixed gear, 5th gear |
| 36 fixed gear, 7th gear |
| 37 shifting unit |
| 38 shifting unit |
| 39 output gear wheel for the constant K |
| 40 outer toothing on differential transmission housing |
| 41 output shaft |
| 42 bevel gear |
| 43 differential transmission |
| 44 axle drive shaft, front axle |
| 45 axle drive shaft, front axle |
| 46 common fixed gear for reverse idler gear and idler gear for 1st gear |
| K1 clutch |
| K2 clutch |

The invention claimed is:

1. A double clutch transmission (1) comprising:
a double clutch (2) having an input (8) connected with a drive shaft of a drive engine and first and second outputs,
a transmission shaft (5) connected to the first output of the double clutch (2),
a hollow transmission shaft (4) coaxial with the transmission shaft (5) and connected to the second output of the double clutch (2),
an intermediate shaft (22),
a plurality of fixed gears (12, 13, 14, 15, 26, 27, 35, 36) mounted on each of the transmission shaft (5), the hollow transmission shaft (4) and the intermediate shaft (22),
a plurality of idler gears (10, 11, 16, 17, 29, 32, 33, 34) rotatably supported on each of the transmission shaft (5), the hollow transmission shaft (4) and the intermediate shaft (22), and
a plurality of shifting units (20, 21, 37, 38) for non-rotatably connecting associated idler gears (10, 11, 16, 17, 29, 32, 33, 34) to corresponding ones of the transmission shaft (5), the hollow transmission shaft (4) and the intermediate shaft (22) for realizing desired transmission gear ratios,
wherein a first idler gear and a second idler gear are associated with each shifting unit and the first and the second idler gears associated with each shifting unit are non-sequentially related, and
a first fixed gear for a reverse gear ratio (RG) and a second fixed gear for a first gear ratio (G1) are arranged as one of
axially adjacent gears on the transmission shaft (5), and a single gear on the transmission shaft (5).

2. The double clutch transmission according to claim 1, wherein the single fixed gear (46) or the first fixed gear (13) for the reverse gear (RG) and the second fixed gear (14) for the first gear (G1) are arranged on a coaxially inner transmission input shaft (5), latter two toothed gears (13, 14) are identical in design with respect to dimensions and pinion gearing.

3. The double clutch transmission according to claim 1, wherein the first fixed gear (13) for the reverse gear (RG) is arranged between an axial end (18) of a hollow transmission input shaft (4) and the second fixed gear (14) for the first gear (G1).

4. The double clutch transmission according to claim 1, wherein a fixed gear (12) for the second gear (G2) is arranged on an axially open end (18) of a hollow transmission input shaft (4).

5. The double clutch transmission according to claim 1, wherein a torsional oscillation damper (6) is arranged between the input side (8) of the double clutch transmission (2) and the drive shaft of the drive engine.

6. The double clutch transmission according to claim 1, wherein toothed gears for even-numbered gears (G2, G4, G6) are arranged on a hollow transmission input shaft (4), and toothed gears for odd-numbered gears (G1, G3, G5, G7) along with the reverse gear (RG) are arranged on another, inner transmission input shaft (5).

7. The double clutch transmission according to claim 6, wherein the toothed gears are arranged in a gear sequence with respect to the double clutch (2) of fourth gear (G4), sixth gear (G6), second gear (G2), reverse gear (RG), first gear (G1), third gear (G3), seventh gear (G7), fifth gear (G5).

8. The double clutch transmission according to claim 1, wherein the fixed gears for the reverse gear (RG), the first gear (G1) and a third gear (G3) can be driven via a radially outer clutch (K1), while the fixed gear (12) for a second gear (G2) can be driven via a radially inner clutch (K2) of the double clutch (2).

9. The double clutch transmission according to claim 1, wherein two shifting units (37, 38) are arranged on the intermediate shaft (22) axially between two shifting units (20, 21) on the two transmission input shafts (4, 5).

10. The double clutch transmission according to claim 9, wherein a single common shifting unit (20) is allocated to first idler gears (10, 11) for a sixth gear (G6) and a fourth gear (G4), a single common shifting unit (21) is allocated to second idler gears (16, 17) for a fifth gear (G5) and a seventh gear (G7), a single common shifting unit (37) is allocated to third idler gears (29, 32) for a second gear (G2) and the reverse gear (RG) on the intermediate shaft (22), and a single common shifting unit (38) is allocated to fourth idler gears (33, 34) for the first gear (G1) and the third gear (G3) on the intermediate shaft (22).

11. The double clutch transmission according to claim 1, wherein a reverse idler gear (32) meshes with a reverse intermediate gear (30), which in turn meshes with a same toothing with the reverse fixed gear (13) or a common fixed gear (46) on the transmission input shaft (5), all reverse toothed gears are arranged in a single reverse gear plane (9).

12. The double clutch transmission according to claim 1, wherein a fixed output gear (28) is non-rotatably arranged on the intermediate shaft (22), and meshes with an output gear (39) which is mounted on an output shaft (41), the open end of which supports a bevel gear (42), which meshes with an outer toothing (40) on a housing of a differential transmission (43).

13. The double clutch transmission according to claim 1, wherein an output shaft (41) leads to a differential transmission (43) of the vehicle that is allocated to one of front-axle drive shafts (44,45) or rear-axle drive shafts.

14. The double clutch transmission according to claim 1, wherein an end (25) of the intermediate shaft (22) that points away from the double clutch (2) can be connected to an output shaft cardan shaft (19) that leads to rear wheels of the vehicle.

15. The double clutch transmission according to claim 1, wherein an end (31) of the intermediate shaft (22) that points toward the double clutch (2) supports a bevel gear, which meshes with an outer toothing on a housing of a differential transmission (24).

16. The double clutch transmission according to claim 1, wherein the intermediate shaft (22) drives an inter-axle differential transmission of any design.

17. The double clutch transmission according to claim 16, wherein the inter-axle differential transmission is arranged on a side of the intermediate shaft (22) that faces away from the drive engine.

18. A double clutch transmission (1) comprising:
- a double clutch (2) having an input (8) connected with a drive shaft of a drive engine and first and second outputs,
- a transmission shaft (5) connected to the first output of the double clutch (2),
- a hollow transmission shaft (4) coaxial with the transmission shaft (5) and connected to the second output of the double clutch (2), and
- an intermediate shaft (22),
- a plurality of fixed gears (12, 13, 14, 15, 26, 27, 35, 36) mounted on the transmission shaft (5), the hollow transmission shaft (4) and the intermediate shaft (22),
- a plurality of idler gears (10, 11, 16, 17, 29, 32, 33, 34) rotatably supported on the transmission shaft (5), the hollow transmission shaft (4) and the intermediate shaft (22), and
- a plurality of shifting units (20, 21, 37, 38) for non-rotatably connecting associated idler gears (10, 11, 16, 17, 29, 32, 33, 34) to corresponding ones of the transmission shaft (5), the hollow transmission shaft (4) and the intermediate shaft (22) for realizing transmission gear ratios,
    - wherein a first idler gear and a second idler gear are associated with each shifting unit and the first and second idler gears associated with each shifting unit are non-sequentially related, and
    - a first fixed gear for a reverse gear ratio (RG) and a second fixed gear for a first gear ratio (G1) are arranged as one of
        - axially adjacent gears on the transmission shaft (5) and a single gear on the transmission shaft (5),
- a fixed output gear (28) is non-rotatably arranged on the intermediate shaft (22), and meshes with an output gear (39) which is mounted on an output shaft (41) and which has an open end supporting a bevel gear (42) which meshes with an outer toothing (40) on a housing of a differential transmission (43), and
- the fixed output gear (28) is arranged on the intermediate shaft (22) between a fixed gear (26) for a sixth gear (G6) or a fixed gear for a fourth gear (G4) and an idler gear (29) for a second gear (G2).

* * * * *